Figure 8:
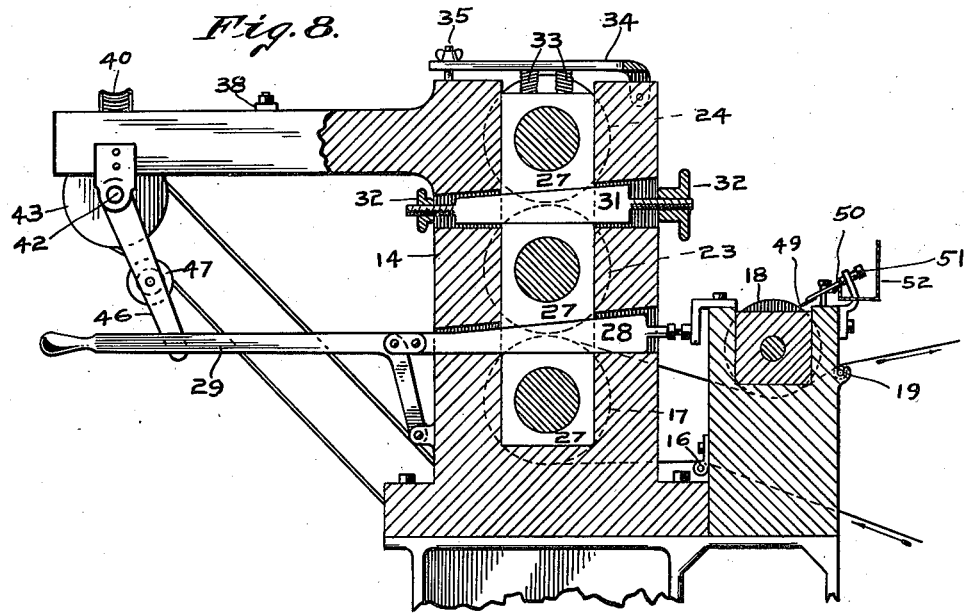

T. T. BUTLER.
PROCESS AND MEANS FOR COATING PAPER WITH CARBON.
APPLICATION FILED APR. 18, 1912.
1,122,473.
Patented Dec. 29, 1914.
8 SHEETS—SHEET 1.
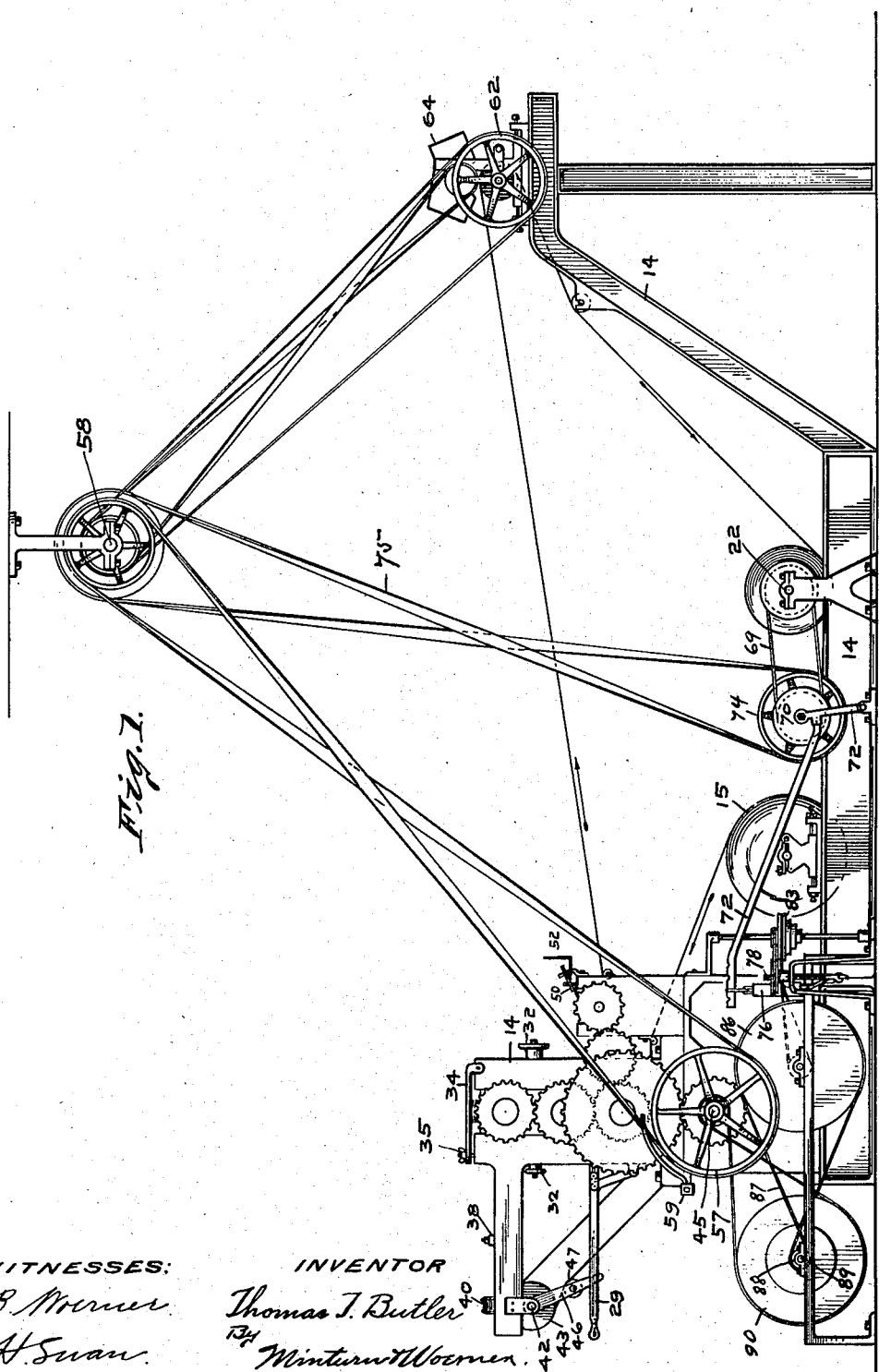
WITNESSES:
L. B. Werner
J. H. Swan
INVENTOR
Thomas T. Butler
By
Minturn W. Werner
ATT'YS.

T. T. BUTLER.
PROCESS AND MEANS FOR COATING PAPER WITH CARBON.
APPLICATION FILED APR. 18, 1912.
1,122,473.
Patented Dec. 29, 1914.
8 SHEETS—SHEET 2.
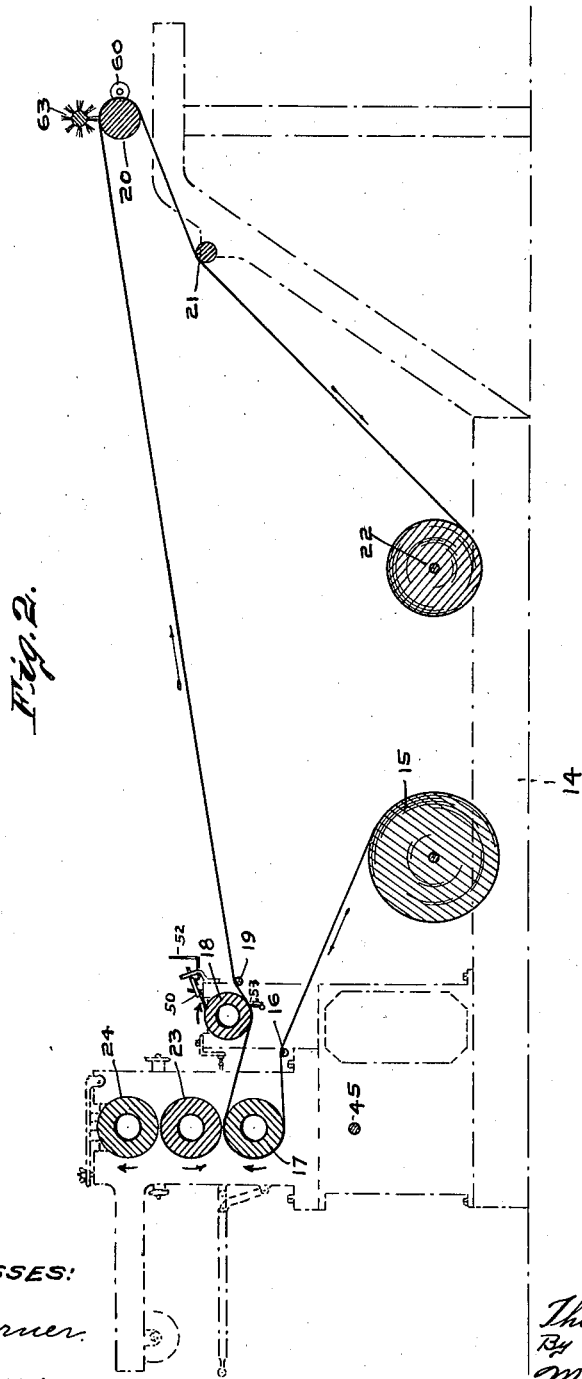

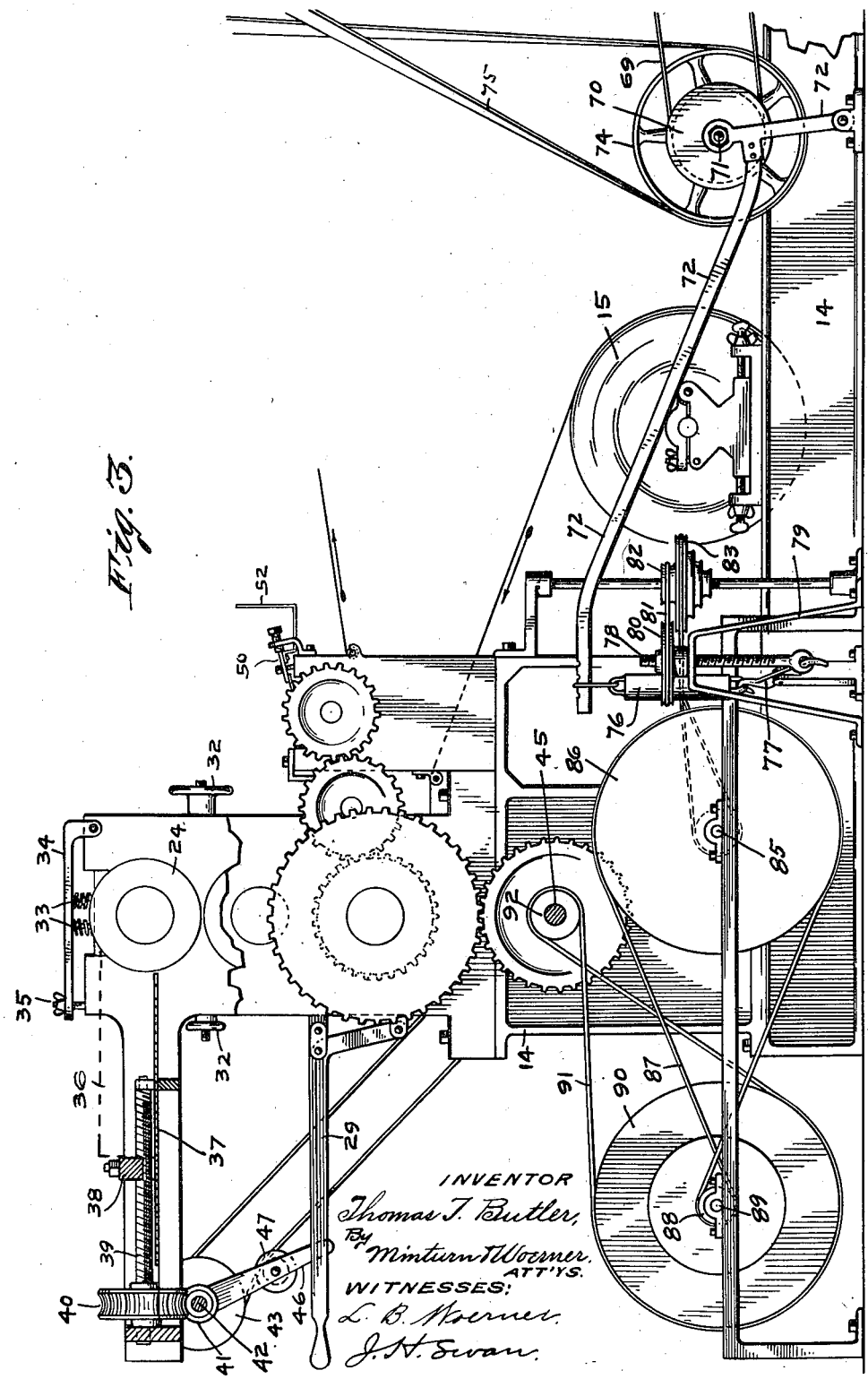

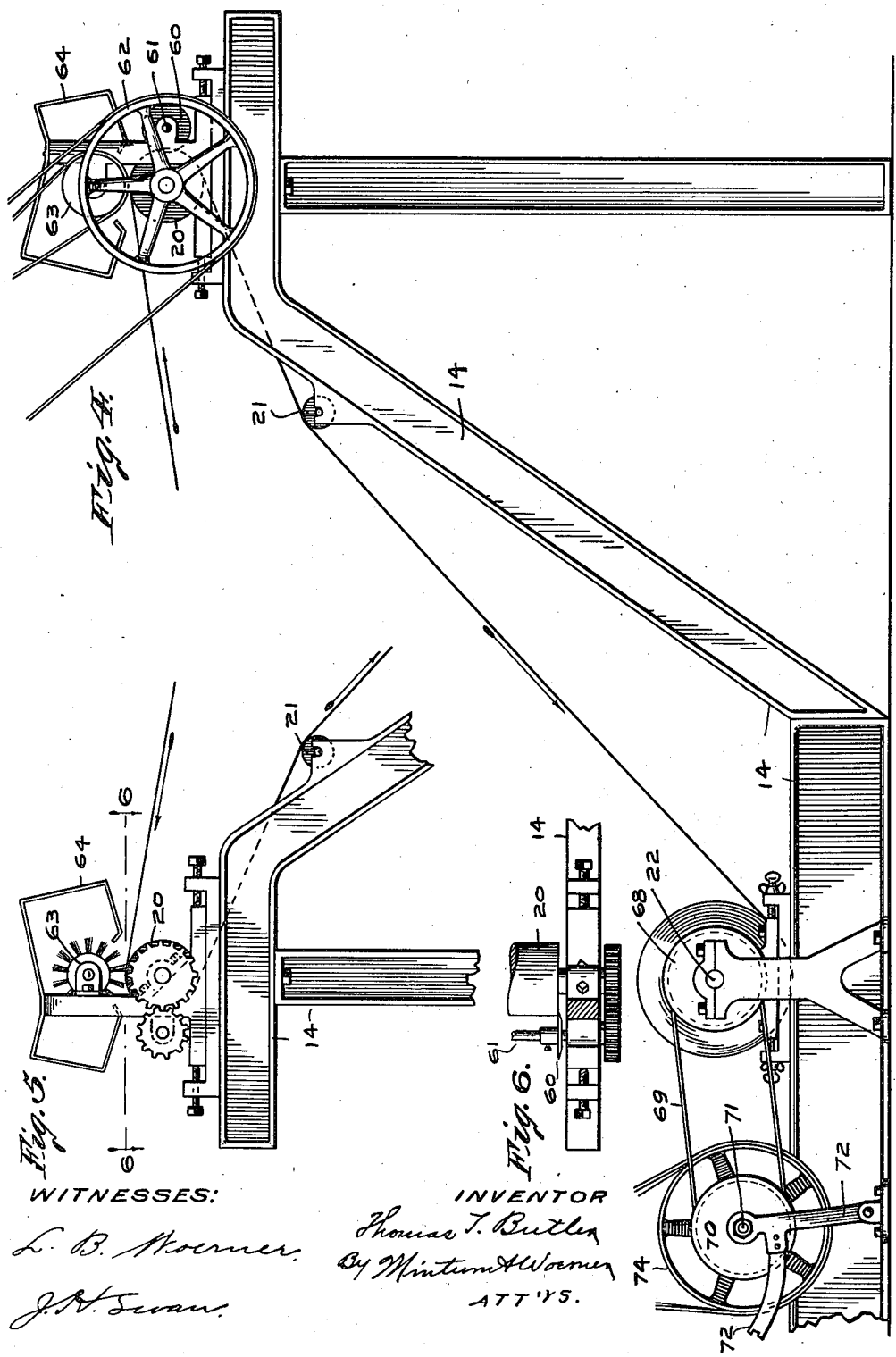

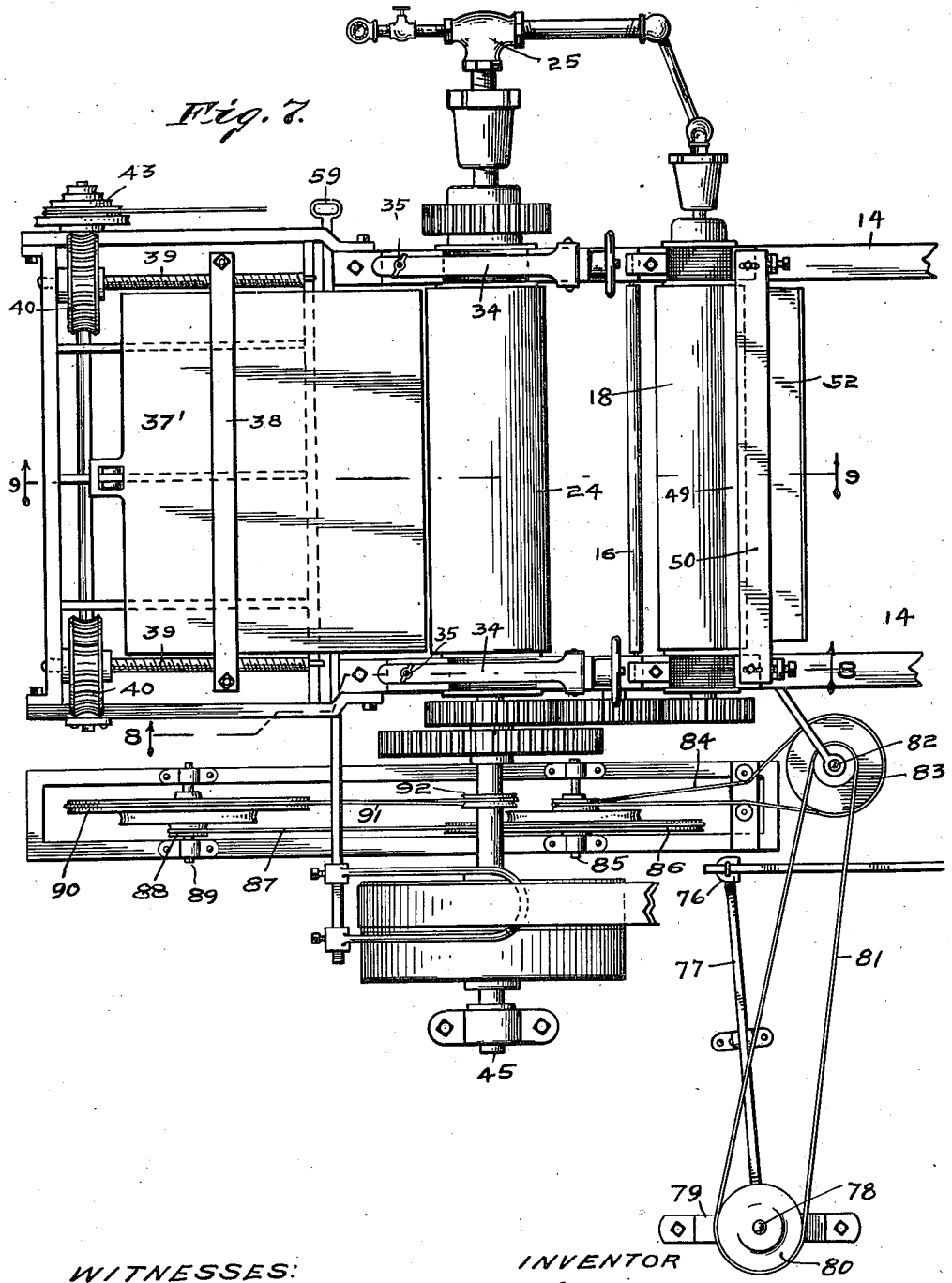

T. T. BUTLER.
PROCESS AND MEANS FOR COATING PAPER WITH CARBON.
APPLICATION FILED APR. 18, 1912.

1,122,473.

Patented Dec. 29, 1914.

8 SHEETS—SHEET 6.

WITNESSES:
L. B. Woerner.
J. H. Swan.

INVENTOR
Thomas T. Butler,
By Minturn & Woerner
ATT'YS.

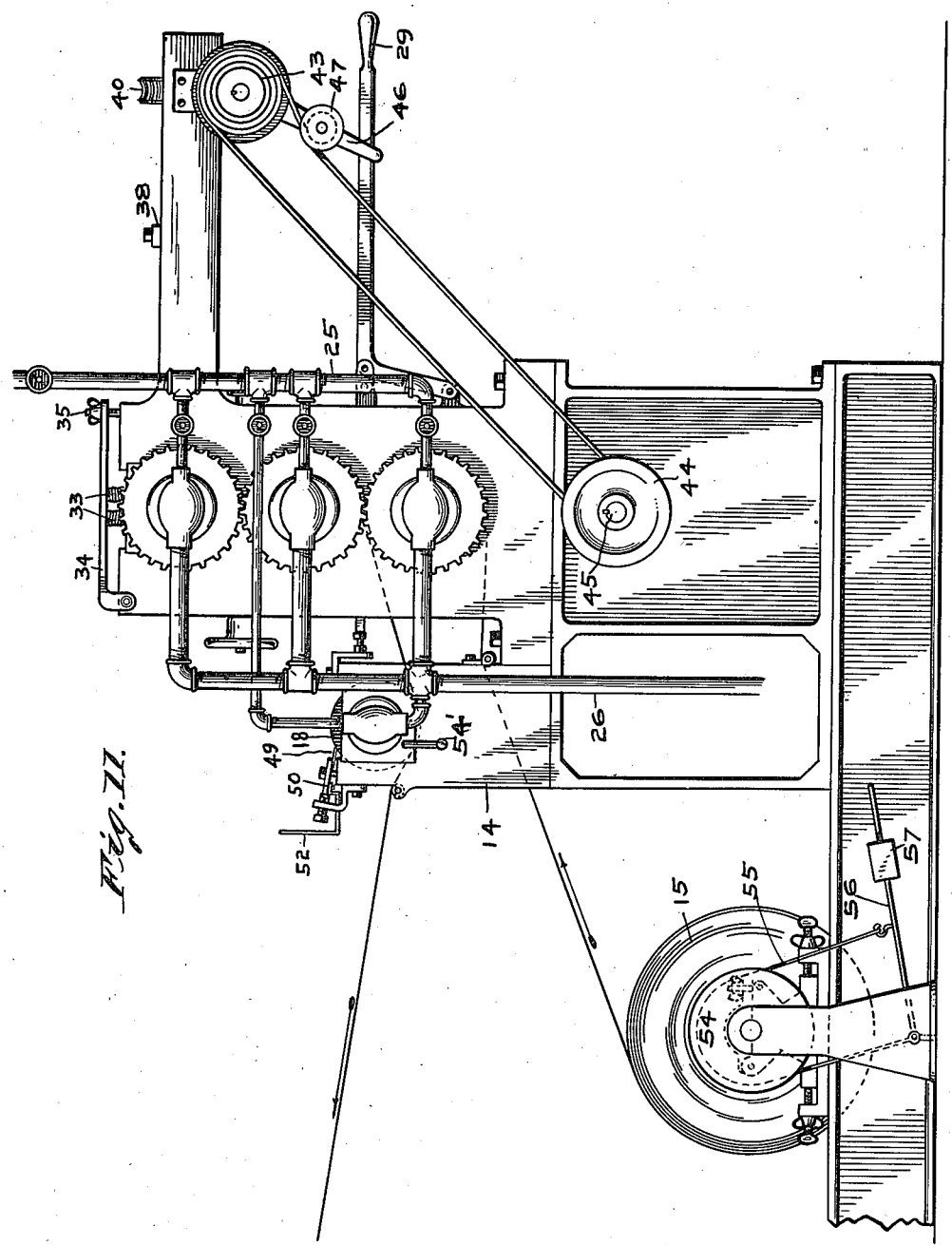

T. T. BUTLER.
PROCESS AND MEANS FOR COATING PAPER WITH CARBON.
APPLICATION FILED APR. 18, 1912.
1,122,473.
Patented Dec. 29, 1914.
8 SHEETS—SHEET 8.
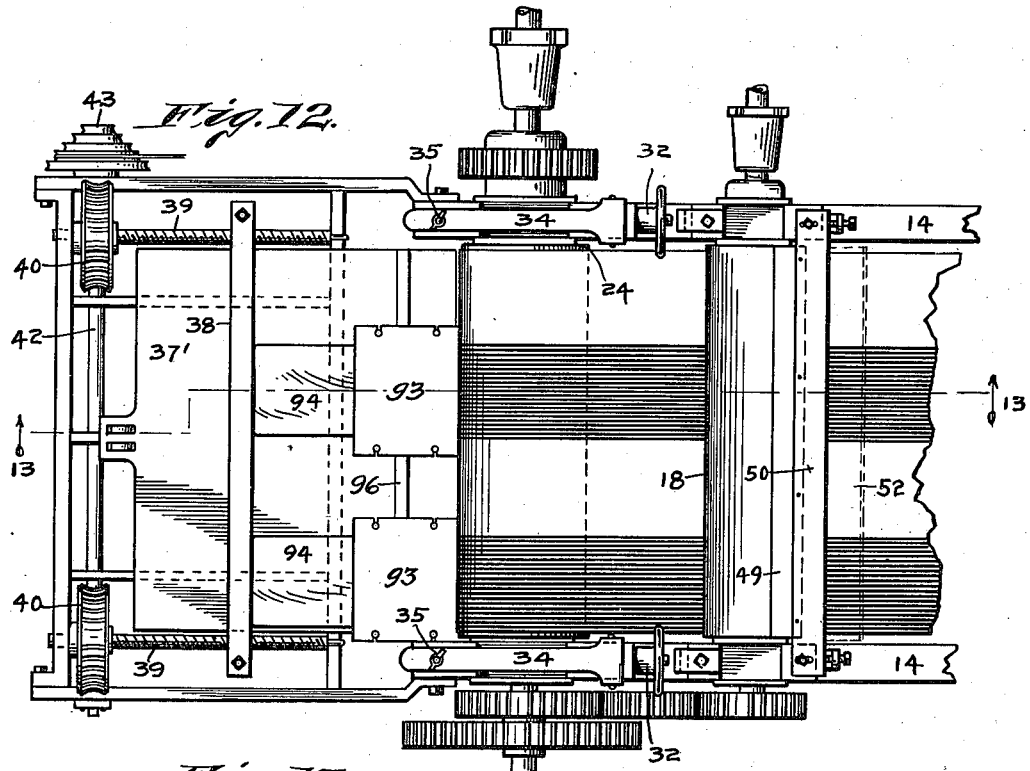
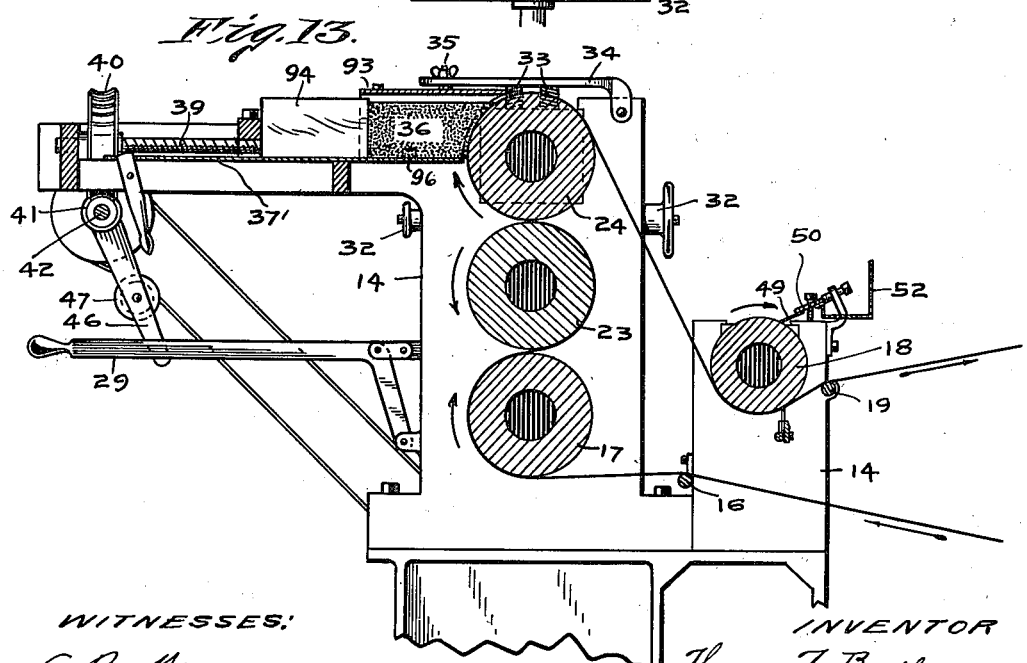
WITNESSES:
L. B. Woerner.
J. H. Swan.
INVENTOR
Thomas T. Butler,
By
Minturn & Woerner
ATT'YS.

UNITED STATES PATENT OFFICE.

THOMAS T. BUTLER, OF NOBLESVILLE, INDIANA.

PROCESS AND MEANS FOR COATING PAPER WITH CARBON.

1,122,473.  Specification of Letters Patent.  Patented Dec. 29, 1914.

Application filed April 18, 1912. Serial No. 691,590.

*To all whom it may concern:*

Be it known that I, THOMAS T. BUTLER, a citizen of the United States, residing at Noblesville, in the county of Hamilton and State of Indiana, have invented certain new and useful Improvements in Processes and Means for Coating Paper with Carbon, of which the following is a specification.

This invention relates to machines for applying a thin coat of carbon to one side of paper in such a manner that the carbon will not come off to soil the fingers or adjacent paper surfaces without the exercise of an extra amount of force. In the use of the product of the machine contemplated by this invention the uncoated side of the paper is generally ruled or printed with lines and words such as are used on sales slips, railroad blanks, and the like, where manifold copies are desired.

In machines for coating paper with carbon, of the type illustrated and described in Patent No. 665,648, issued January 8, 1901, to Frank W. Weeks, the carbon is mixed with tallow and other ingredients to form a cake of about the consistency of soap, and a thin film of this is taken from the cake by a friction roller and is deposited more or less adherently upon one surface of paper drawn between said film coated roller and a second roller below it. This carbon film is then spread upon and is rubbed into the surface of the paper by spring pressed reciprocating rubbers, after which the carbon coat is polished and affixed or hardened so it will not rub off on the fingers or adjacent sheets of paper, by a roller which revolves at a high rate of speed and has chamois or flannel covered wings which contact with the carbon coated surface. In the machine of said Weeks' patent neither the paper nor the carbon are purposely heated during the coating operation, but on the contrary the inventor provides a water jacket with a constant circulation of water through it to prevent such heating as would be occasioned even by friction.

The object of my invention is to provide a process and means whereby carbon from a cake of substantially the same character and consistency as specified in said Weeks' patent, is heated with steam until it becomes liquid and while in this condition is applied to a surface of paper which has been heated to a very high temperature, and because of the hot liquid condition of the carbon and the hot surface of the paper the latter is completely covered and all of its interstices filled, after which the excess of carbon is removed.

A further object of my invention is to provide a machine which will manufacture the above carbon coated paper in a simple, rapid, and economical manner.

Further objects of the invention will appear from an inspection of the accompanying drawings and from the following description and claims.

Figure 9:
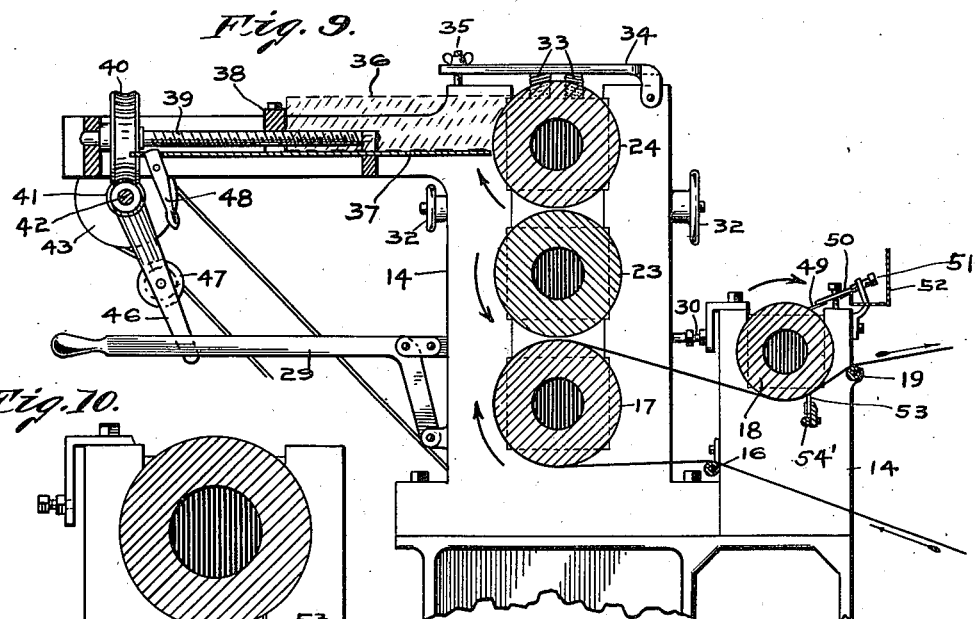
Figure 10:
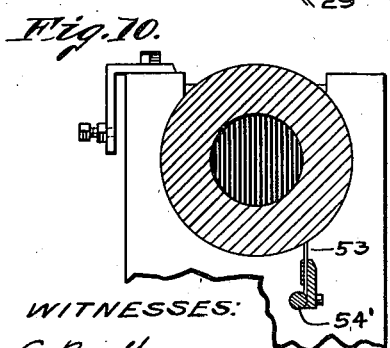

Referring to the accompanying drawings, Figure 1 is a side elevation of a machine constructed in accordance with my invention. Fig. 2 is diagrammatic, and particularly illustrates the manner in which paper from a roll is threaded through the machine in contact with the parts which directly supply the carbon to the paper and finish the carbon coated surface and roll up the finished product, the various rolls and brushes being shown in vertical section and the frame of the machine in dotted lines. Fig. 3 is a side elevation on a larger scale of the front end of the machine illustrated in Fig. 1, with the driving pulley removed and the top of this end of the machine in vertical section. Fig. 4 is an elevation on a larger scale of the rear end of the machine as shown in Fig. 1, and is a continuation of that portion of the machine which was omitted for lack of room on the sheet, in Fig. 3. Fig. 5 is a fragment in elevation of the upper part of the opposite side of the mechanism shown in Fig. 4. Fig. 6 is a detail in horizontal section on the line 6—6 of Fig. 5. Fig. 7 is a top plan view of the front end of the machine shown in elevation in Fig. 3. Fig. 8 is a vertical section on the line 8—8 of Fig. 7. Fig. 9 is a vertical section on the line 9—9 of Fig. 7. Fig. 10 is an enlarged detail of the roll for removing the excess of carbon, shown to the right of the group of three vertical rolls in Fig. 9. Fig. 11 is a view in side elevation of the reverse side of the machine, of that end of the latter which is illustrated in Fig. 3. Fig. 12 is a top plan view of the front end of the machine arranged for imparting a "part-film" carbon coated surface to the paper, that is, for applying the carbon in widths or streaks narrower than the entire width of the paper so as to produce a surface of alternately carbon coated and clear paper extending longitudinally of the entire sheet or roll, and Fig. 13 is a vertical section on the line 13—13 of Fig. 12.

Like characters of reference indicate like parts throughout the several views of the drawings.

14 is a frame of the desired shape, size and strength to support the other parts of my invention. A roll of paper 15 is arranged near the front end of the machine and is fed over a transverse bar 16 and thence under and around and over a transverse horizontal roll 17, and thence to the rear (see Fig. 2) under a roll 18, and thence over a transverse bar 19, and thence over and around a transverse roll 20 at the rear end of the machine and thence over a tension roll 21 and thence to a revolving shaft 22 upon which it is wound into a roll of the finished product.

The roller 17 around which the paper first passes after leaving the roll 15 is hollow and is heated to a high temperature by steam which is supplied at one end from a pipe 25 (see Fig. 11) through a suitable branch-pipe and exhausts into a pipe 26. The bar 16 between the roll 15 and roller 17 is elevated to increase the tension and also to increase the surface contact on the roller 17 to more thoroughly heat the paper. The bar 16 will be bent upwardly at the middle to spread the paper and aid in removing any wrinkles that may be in it. Mounted on the frame 14 of the machine above the roller 17 is a roller 23, and mounted above that is a roller 24. The rollers 23 and 24 are hollow and heated by steam through branch-pipes from the main supply pipe 25, as shown in Fig. 11. The ends of the rollers 17, 23 and 24 terminate in trunnions which are each mounted in corresponding four-sided boxes 27 (see Fig. 8) having vertical adjustment in ways formed in frame 14. Between the boxes of the rollers 17 and 23 are wedges 28 which are adapted to be moved longitudinally by levers 29 to vary the distance of the boxes of roller 23 from those of the under roller 17. The boxes at each end of roller 23 are independently adjustable, as above described, to enable any necessary corrections in distance between the two rollers to be made in order to bring them into parallelism with each other. The large end of the wedge 28 contacts with a set-screw 30 to regulate the throw of the wedge in that direction.

The boxes of the top roller 24 are separated from those of the under roller 23 by wedges 31 which have reduced and threaded ends to receive adjusting nuts 32.

The top box 27 is held down elastically by springs 33 which bear at their upper ends against a lever 34 which is pivoted at one end to the frame of the machine and has its opposite end adjustably secured by a nut on a threaded-bolt 35.

The cake of carbon 36 from which the paper is to be coated is placed upon a suitably supported horizontal table 37 opposite the top roller 24, between said roller and a push-bar 38. The push-bar 38 is moved toward or from the roller 24 by means of a pair of screw-rods 39. Mounted on the screw-rods 39 are worm-wheels 40 which mesh with worms 41 on a transverse shaft 42. Mounted on one end of the shaft 42 are stepped-pulleys 43 which are driven from corresponding pulleys 44 on shaft 45 by suitable belt connection. Swinging from shaft 42 is a lever 46 carrying a wheel 47 for tightening the belt which drives the shaft 42. To move the push-bar 38 away from roller 24 the drive-belt to shaft 42 is loosened by an outward movement of the hand-lever 46, and then by reversing the movement of shaft 42 the screw-shafts 39 will be reversed to withdraw the push-bar 38. When the machine is stopped and it is desired to move the cake 36 out of melting contact with the hot roller 24 the push-bar 38 is withdrawn as above described and then the cake is moved away from the roller by a corresponding movement of the table 37 obtained by a movement of a lever 48 which is pivoted to the frame of the machine and has its upper end engaging the table.

By contact with the hot roller 24 the carbon cake is melted to a liquid condition as it is fed by the above-described positive mechanism against it, and a film of the liquid is carried over the roller and down into contact with the middle roller 23 which is adjusted a predetermined distance from the roller 24 according to the thickness of the film which it is desired to carry on down by the roller 23 and deposit upon the heated surface of the paper passing over the roller 17 below it. The distance between the rollers 23 and 17 is so regulated as to force the liquid carbon against the paper under pressure, and this pressure together with the heated condition of the fiber of the paper and the hot fluid condition of the carbon mixture causes the latter to thoroughly permeate all portions of the paper surface immediately.

To insure a perfectly distributed and adherent coating of the paper it is necessary to apply the carbon mixture in greater quantities, that is, in a thicker coat than the finished product should have, and the removal of this excess is the next operation of my machine. This removal is primarily accomplished by means of a fourth hollow steam-heated roller 18, under which the paper next passes. This roller 18 is heated by steam from the pipe 25 as shown in Fig. 11. The operation is successful for this and the other hollow rollers by using steam showing a pressure on the gage anywhere between 12 and 100 pounds, or from about 200° F. to 330° F. The bar 19 is so placed with relation to the roller 18 as to increase the wrap or contact surface of the paper against said roller. The roller 18 rotates at a slightly greater speed than the roller 17 and consequently than the rate of travel of the paper, and in the opposite direction to the travel of the paper. The surface of the roller is very smooth and highly polished and in its operation it picks up all of the excess carbon on the paper which, adhering to the surface of the roller is carried up to a scraper 49 contacting longitudinally of the upper rear surface of the roller. This scraper is of sheet-metal removably secured for purposes of renewal, required by the wear due to frictional contact with the roller, to a heavier plate adjustably supported by set-screws 50 from the machine frame. The plate is pressed against the roller by set-screws 51. A trough 52 is provided to gather the accumulation of carbon material removed from the paper by the mechanism above described. A regulated pressure of the paper against the roller 18 may be necessary with some of the heavier grades of paper and is secured by a felt strip 53 to contact with the roller and carried by a bar 54' having a rocking adjustment toward or from the roller.

The bar 19 not only increases the wrap of the paper against the roller 18 but also acts as a tension device, and to keep the paper free from wrinkles. The tension on the paper is additionally regulated by a brake mechanism illustrated in Fig. 11 wherein a brake wheel 54 mounted on the shaft on which the roll of paper 15 is mounted is contacted by a brake strap 55, one end of which strap is attached to a lever 56 on which is a weight 57 adjustable in its distance from the fulcrum of the lever to regulate the friction pull of the brake strap against the wheel 54.

The shaft 45, previously referred to, has a pulley 57 which is driven by belt-connection with a corresponding pulley on a power driven shaft 58, here shown as mounted above the machine (see Fig. 1). A train of gears drivingly connects the respective rollers 17, 23, 24 and 18 with the shaft 45 to drive them in the directions indicated by the arrows in Fig. 9. Mounted on the shaft 45 is a loose pulley to which the belt is shifted in the usual manner by a handle 59 on the opposite side of the machine (see Fig. 7).

After leaving the bar 19 the paper passes to the rear end of the machine over and around the roller 20. The latter is a feed roller and is located at a suitable distance from the last hot roller 18 to permit the coated paper to become partially air cooled. As it is difficult to keep the carbon material from soiling the under edge of the paper during the coating process it is necessary to trim both edges of the paper in order to remove the soiled portion which does not extend much more than an eighth of an inch in from the edge, but on account of the fragile character of the article it is necessary to trim off twice that width. This is accomplished by means of cutting disks 60 (see Fig. 6) mounted on a shaft 61 parallel with the shaft on which the roller 20 is mounted, and the disk 60 cuts against the end of the roller 20 as shown in Fig. 6. The shaft on which the roller 20 is mounted is connected with the shaft 61 by spur gears as shown in Figs. 5 and 6 the diameters of which are proportioned to cause the shaft 61 and its cutting disk 60 to rotate somewhat faster than the travel of the roller 20. The shaft for roller 20 has a pulley 62 which is driven by a belt from a smaller pulley on the shaft 58. The function of the roller 20 is to feed the paper through the machine and also to act in conjunction with the trimming-cutters as above described. To assist the roller 20 in feeding the paper through the machine, and also to sweep off any loosely adhering particles of carbon I provide a rotary brush 63 above and parallel with the roller 20 which is driven at a much higher rate of speed by crossed belts from a pulley on the shaft 58, in the opposite direction to the travel of the roller 20. A hood 64 collects the refuse matter brushed off by the brush 63.

From the feed roll 20 the paper passes over the tension roll 21 to the under side of the revolving shaft 22 upon which it is rewound. Should it be desirable to split the paper longitudinally into rolls of smaller width this is readily accomplished by placing vertical cutting blades (not shown) between the roll 21 and shaft 22 across the path of the paper, which, being taut is cut without danger of tearing.

By the action of the brake mechanism illustrated in Fig. 11 and previously described the paper is fed off of the roll 15 at a uniform speed without difficulty, but in rewinding the paper on shaft 22 it is necessary to provide a tension device which will cause the paper as the roll gradually increases in diameter to be wound with a uniform tension and I will now describe the mechanism by which this is accomplished.

Mounted on the shaft 22 is a pulley 68 by which power is applied to a belt 69 from a pulley 70 to drive the shaft 22. The pulley 70 is mounted on a shaft 71 which is supported by a bent-lever 72. The lever 72 is pivoted below the shaft 71 to the frame of the machine, and the long arm of the lever extends toward the front of the machine. It will thus be seen that the shaft 71 and its pulley 70 are swingingly supported whereby it is possible to secure a slipping drive of the belt 69 from the pulley 70 to the pulley 68, and gradually increasing friction contact between said belt and pulleys to compensate for the increased resistance resulting from the constantly increasing diameter of the roll of paper on shaft 22 by swinging the shaft 71 gradually away from the shaft 22. This is accomplished by gradually lowering the long arm of the lever 72. Mounted on the shaft 71 is a second pulley 74 which is positively driven by the crossed belt 75 from a suitable pulley on the shaft 58 whereby a direct constant power is transmitted to the shaft 71 sufficient to rotate the shaft 22 under all conditions.

A spring balance 76 connects the outer end of the lever 72 with an arm of a lever 77 (see Figs. 3 and 7) and the opposite arm of the lever 77 hooks into an eye in the lower end of a vertical screw-shaft 78 supported by a standard 79 located alongside of the machine. The screw-shaft 78 passes through the correspondingly threaded hole or bore in the hub of a pulley 80. The pulley 80 is connected by a belt 81 with a smaller pulley on a vertical shaft 82, and mounted on the shaft 82 is a much larger pulley 83 which is connected by a belt 84 with a smaller pulley on a horizontal shaft 85. Mounted on the shaft 85 is a much larger pulley 86 which is connected by a belt 87 with a very much smaller pulley 88 on a shaft 89. Mounted on the shaft 89 is a very much larger pulley 90 which is connected by a belt 91 with a very much smaller pulley 92 on the shaft 45, which is the main driving shaft of the machine. By the above described transmission the pulley 80 on the screw-shaft 78 is driven at a very much reduced speed, and the shaft 78 is longitudinally raised at a slow rate. The upward movement of the screw-shaft 78 operates the lever 77 to lower the adjacent arm of the lever 72 thereby swinging the shaft 71 away from the shaft 22 as the size of the roll of paper on the shaft 22 increases. By means of the register on the spring balance 76 the pull on the lever 72 can be ascertained and regulated by hooking the upper end of the balance into the proper one of a series of notches provided in the lever 72 for that purpose.

In the modification shown in Figs. 12 and 13 which illustrates the adaptation of the machine for coating the paper in alternate spaces of white and black, the paper is threaded differently, that is, instead of passing from the roll 17 direct to the roll 18 it passes around the middle roll 23 to the rear of the latter and thence in front of the top roll 24 and over said roll and thence down and under the roll 18, the threading of the paper otherwise being just the same as has already been described. In the manufacture of this so called "part-film" paper it is necessary in order to utilize the several rolls without remodeling the machine to thread the paper as above described in order that the carbon-cakes may be applied directly to the surface of the paper. Otherwise, the carbon film would be distributed by the rolling together of the two upper rollers before reaching the paper so as to spread the carbon material in a way which would make the carbon strips uneven and irregular on the finished product. In carrying out this "part-film" manufacture the cakes of carbon of just the width of the markings desired on the paper are placed on the table 37' in the desired position, as shown in Fig. 12, between the roller 24 and push-bar 38 in housings 93. The housings 93 serve as guides to direct the cake evenly against the paper on the roll 24, and to permit all of the carbon cake to be utilized I provide the following block 94 of wood or other suitable material between the push-bar 38 and cake to follow the latter into the housings. The housings 93 will comprise adjustable sides with upper and lower outside flanges. In the lower flanges are transverse slots to receive the ends of guide-bars 96 projecting up from the table 37', and the tops of the housings are bolted as shown to the upper flanges of the sides.

The operation of my machine has been described in connection with the various operative parts so that it will be well understood without further elaboration.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and substitution of equivalents as circumstances may suggest or as necessity may render expedient.

I claim—

1. The process of coating paper with practically hard carbon consisting in initially supplying and simultaneously affixing an excess of carbon to one surface of the paper and then removing the excess of carbon before it permeates through the paper.

2. The process of coating paper with practically hard carbon consisting in initially supplying and simultaneously affixing an excess of carbon to one surface of the paper and then removing the excess of carbon before it permeates to the other side of the paper leaving a thin and practically uniform even coat of hard carbon on the paper.

3. The process of coating paper with practically hard carbon which consists in heating the carbon to a liquid or semi-liquid condition, heating the paper and applying an excess of said hot carbon to the hot paper and then removing the excess of carbon before it permeates through the paper.

4. The process of coating paper with practically hard carbon which consists in heating the carbon to a liquid or semi-liquid condition, heating the paper and applying an excess of said hot carbon to the hot paper and then removing the excess of carbon before it has cooled to a practically hard state and before it has permeated to the other side of the paper.

5. The process of coating paper with practically hard carbon which consists in heating the carbon and the paper above 200° F., applying the hot carbon to the hot paper in excess and removing the carbon excess before it has permeated through the paper.

6. The process of coating paper with practically hard carbon which consists in heating the carbon and the paper to approximately 300° F., applying the hot carbon to the hot paper in excess and removing the carbon excess before it has permeated through the paper.

7. In a machine for supplying practically hard carbon to paper, the combination of means for initially supplying and simultaneously affixing an excess of carbon to the surface of the paper and means for removing the excess of carbon before it permeates the paper.

8. In a machine for supplying practically hard carbon to paper, the combination of means comprising hot rollers for initially supplying and simultaneously affixing an excess of carbon evenly to the surface only of the paper and means for removing the excess of carbon.

9. In a machine for supplying practically hard carbon to paper, the combination of means for initially supplying and simultaneously affixing an excess of carbon to the surface of the paper and means comprising a scraper for removing the excess of carbon.

10. A machine for making hard carbon surface paper comprising a paper feed, means for applying and simultaneously affixing a practically hard carbon to one surface of the paper and means for removing the excess leaving a practically uniform even coat of hard carbon on one side of the paper without staining through.

11. In a machine for practically supplying hard carbon to paper, the combination of means for heating the paper, means for rendering the carbon-cake liquid by heat, means for applying an excess of hot liquid carbon to the hot paper and means for removing the excess of carbon before it stains through.

12. In a machine for supplying practically hard carbon to paper, means for applying heat to the carbon-cake to reduce it to a liquid and for heating the paper and for applying the hot liquid carbon in excess to the hot paper and means for removing the excess.

13. In a machine of the class described, the combination of a hot roll, means for feeding a cake of carbon into the heated zone of the roll to melt it to a liquid, means for heating the paper and for feeding it through the machine, means for applying an excess of the hot liquid carbon to the hot paper and closely adjacent means for removing the hot excess.

14. In a machine of the class described, the combination of a hot roll, means for feeding a cake of carbon toward the roll to be melted to liquid form by the heat of the roll, means for heating the paper, means for applying an excess of the hot liquid carbon to the hot paper, and means comprising a hot revolving roll to contact with the carbon coated surface of the paper to remove the excess of carbon.

15. In a machine of the class described, the combination of a hot roll, means for feeding the cake of carbon in the hot zone of the roll to change it to a liquid by the heat of the roll, means for heating the paper, means for feeding the paper through the machine, means for applying an excess of the hot liquid carbon to the hot paper, and means comprising a hot roll revolving in contact with the carbon coated surface of the paper in opposite direction to the travel of the paper to remove the excess of carbon.

16. In a machine of the class described, the combination of a hot roll, means for feeding the cake of carbon in the hot zone of the roll to change it to a liquid by the heat of the roll, means for heating the paper, means for feeding the paper through the machine, means for applying an excess of the hot liquid carbon to the hot paper, and means comprising a hot roll revolving in the opposite direction to the travel of the paper to remove the excess of carbon, and means for removing the carbon from the last roll.

17. In a machine of the class described, the combination of a hot roll, means for feeding the cake of carbon in the hot zone of the roll to change it to a liquid by the heat of the roll, means for heating the paper, means for feeding the paper through the machine, means for applying an excess of the hot liquid carbon to the hot paper, a hot roll revolving in the opposite direction to the travel of the paper to remove the excess of carbon, and a scraper for removing the carbon from this last roll.

18. In a machine for supplying practically hard carbon to paper, the combination of means for heating the paper, means for applying an excess of carbon rendered liquid by heat to the paper, means for feeding the paper through the machine, and a hot roll revolving in an opposite direction to the travel of the paper against its hot carbon coated surface to remove the excess of carbon.

19. In a machine for supplying practically hard carbon to paper, the combination of means for heating the paper, means for applying an excess of carbon rendered liquid by heat to the paper, means for feeding the paper through the machine, a hot roll revolving in an opposite direction to the travel of the paper against its hot carbon coated surface, and a scraper to remove the carbon from the roll.

20. In a machine for supplying practically hard carbon to paper, the combination of means for feeding the paper through the machine, means for heating the paper, means for rendering the carbon-cake liquid by heat, means for applying an excess of hot liquid carbon to the hot paper, a hot roll revolving in opposite direction to the travel of the paper in contact with the carbon coated surface of the paper to remove the excess of carbon, and means for regulating the pressure between the roll and paper.

21. In a machine for supplying practically hard carbon to paper, the combination of means for feeding the paper through the machine, means for heating the paper, means for rendering the carbon-cake liquid by heat, means for applying an excess of hot liquid carbon to the hot paper, a hot roll revolving against the hot carbon coated surface of the paper to remove the excess of carbon, and means contacting with the under side of the paper and forcing it with regulated pressure against the roll.

22. In a machine for supplying practically hard carbon to paper, the combination of means for applying an excess of hot liquid carbon to the heated surface of the paper, a hot roll revolving against the hot carbon coated surface of the paper to remove the excess of carbon, adjustable means for pressing the paper against the roll with a regulated pressure, and a scraper for removing the carbon from the roll.

23. In a machine of the class described, the combination of a hot roll, means for feeding a cake of carbon against the roll to melt the carbon to a liquid form, a second hot roll, means for feeding the paper against and over said second hot roll to heat the paper, a third hot roll receiving hot liquid carbon from the first roll and depositing it upon the hot paper of the second roll, and a fourth hot roll contacting with the hot carbon coated surface of the paper to remove the excess of carbon.

24. In a machine of the class described, the combination of a hot roll, screw-operated means for feeding a cake of carbon against the roll to melt the carbon to a liquid, a second hot roll, means for feeding the paper around said second hot roll to heat the paper, a third hot roll between said first and second rolls receiving hot liquid carbon from the first roll and depositing it upon the surface of the heated paper of the second roll, a fourth hot roll to the rear of the other rolls contacting with the hot carbon coated surface of the paper to remove excess of carbon, and means for removing the carbon from this fourth roll.

25. In a machine of the class described, the combination of a hot roll, means for feeding a cake of carbon against it to melt the carbon to a liquid, a second hot roll under the first, means for feeding the paper around said second hot roll to heat the paper, a third hot roll between the said first and second rolls receiving the hot liquid carbon from the first roll and depositing it upon the surface of the heated paper of the second roll, said first and third rolls being mounted in vertically adjustable journals, horizontally adjustable wedges for regulating the distance between the surfaces of all three of said rolls, and a fourth hot roll to the rear of the other rolls contacting with the hot carbon coated surface of the paper to remove excess of carbon.

26. In a machine for supplying practically hard carbon to paper, the combination of means for heating the paper, means for rendering the carbon-cake liquid by heat and for applying an excess of the liquid carbon to the hot paper, means comprising a roller and a scraper for removing the excess of carbon, a roller at the opposite end of the machine from said first means over which the coated paper passes, means for positively driving said last roller, and cutters at the ends of the last roller for trimming the longitudinal edges of the paper as it passes said last roll.

27. In a machine for supplying practically hard carbon to paper, the combination of means for heating the paper, means for rendering the carbon-cake liquid by heat and for applying an excess of the liquid carbon to the hot paper, means comprising a roller and a scraper for removing the excess of carbon, a roller at the opposite end of the machine from said first means over which the coated paper passes, means for positively driving said last roller, cutters working in conjunction with the ends of said last roller for trimming the edges of the paper as it passes said last roll, and a rotary brush above the last roll to sweep the coated surface of the paper.

28. In a machine for supplying practically hard carbon to paper, the combination of means for heating the paper, means for rendering the carbon-cake liquid by heat and for applying an excess of the liquid carbon to the hot paper, means for removing the excess of carbon before the carbon permeates through the paper, a roller at the opposite end of the machine from said first means over which the coated paper passes, means for positively driving said last roller, and circular cutters rotating in conjunction with the ends of the last roller for trimming the longitudinal edges of the paper as it passes said last roll.

29. In a machine of the class described, a roll of paper from which the material to be carbon coated is supplied, a brake means to regulate the discharge from said paper roll, means for coating the paper with carbon, a roll upon which the coated paper is rewound, and automatic means for imparting a variable speed to the last roll to correspond with the increasing size of the roll as the paper is wound upon it, said means comprising a swinging lever, a power-driven shaft carried by said lever, a pulley on said lever, a pulley on the shaft of the winding roll, a slip-belt connecting the two pulleys, and means for moving the lever to increase the distance between said pulleys and tighten the belt as the size of the roll increases.

In witness whereof, I have hereunto set my hand and seal at Noblesville, Indiana.

THOMAS T. BUTLER. [L. S.]

Witnesses:
  W. E. DUNN,
  E. S. BADEN.